(12) United States Patent
Tobita et al.

(10) Patent No.: US 6,320,839 B1
(45) Date of Patent: Nov. 20, 2001

(54) OPTICAL INFORMATION RECORDING MEDIUM, OPTICAL INFORMATION RECORDING METHOD AND OPTICAL INFORMATION RECORDING APPARATUS

(75) Inventors: Minoru Tobita, Tokyo; Goro Fujita; Shingo Imanishi, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/178,750

(22) Filed: Oct. 27, 1998

(30) Foreign Application Priority Data

Oct. 28, 1997 (JP) ............................... P09-295695

(51) Int. Cl.$^7$ ....................................... G11B 7/24
(52) U.S. Cl. .................... 369/275.4; 369/44.13; 369/116
(58) Field of Search ............................ 369/44.13, 275.4, 369/275.2, 275.1, 119, 116, 100; 264/1.33, 1.36

(56) References Cited

U.S. PATENT DOCUMENTS

| | | | |
|---|---|---|---|
| Re. 34,719 | * 9/1994 | Yamamoto et al. | ............... 369/119 |
| 5,539,724 | * 7/1996 | Ohtomo | ............... 369/275.4 |
| 5,820,795 | * 10/1998 | Takemori et al. | ............... 264/1.36 |
| 5,844,882 | * 12/1998 | Yoshida et al. | ............... 369/275.4 |
| 5,940,364 | * 8/1999 | Ogata | ............... 369/275.4 |
| 6,118,756 | * 9/2000 | Masuhara et al. | ............... 369/275.4 |

* cited by examiner

*Primary Examiner*—David Hudspeth
*Assistant Examiner*—Kim-Kwok Chu
(74) *Attorney, Agent, or Firm*—Sonnenschein, Nath & Rosenthal

(57) ABSTRACT

An optical information recording medium, an optical information recording method and an optical information recording apparatus are able to prevent one laser beam of two laser beams from affecting the other laser beam by an offset. In an optical disc in which a groove whose one-side is wobbled or modulated only is sequentially formed by turning on or off one laser beam of two laser beams in accordance with a modulation signal and desired data is recorded by the groove, since the groove is formed by wobbling the one laser beam in such a manner that the one laser beam may not affect the other laser beam, a light intensity of the one laser beam is not added to a light intensity of the other laser beam, which is not wobbled by a wobbled amount so that the other-side of groove may be protected from the influence of the offset.

6 Claims, 10 Drawing Sheets

OPTICAL INFORMATION RECORDING MEDIUM, OPTICAL INFORMATION RECORDING METHOD AND OPTICAL INFORMATION RECORDING APPARATUS

BACKGROUND OF THE INVENTION

1. Field of the Invention

The present invention relates to an optical information recording medium, an optical information recording apparatus and an optical information recording method which may be applied to a magnetooptical disc (MO), a compact disc (CD, CD-ROM (compact disc-read-only memory)), a digital video disk (DVD) and a recording method and a recording apparatus of these discs, for example.

2. Description of the Related Art

Heretofore, a recording apparatus for a compact disc made of this kind of optical information recording medium processes recording data and then EFM (eight-to-fourteen modulation)-modulates the processed data to form a pit string having periods 3T to 11T with respect to a fundamental period T, thereby resulting in audio data or the like being recorded.

Corresponding thereto, a compact disc player receives a returned light of a laser beam reflected on the surface of a compact disc surface after having irradiated the laser beam on the surface of the compact disc and obtains a reproduced signal the signal level of which changes in response to a quantity of light of this returned light. Then, the compact disc player generates a binary signal by binarizing this reproduced signal with a predetermined slice level. Further, the compact disc player generates a reproducing clock by driving a PLL (phase-locked loop) circuit with this binary signal, and sequentially latches the binary signal by this reproducing clock, thereby resulting in reproduced data of the periods 3T to 11T corresponding to the pit string formed on the compact disc being generated.

The compact disc player decodes the reproduced data thus generated by the data processing corresponding to the data processing during the recording mode to reproduce audio data or the like recorded on the compact disc.

Recently, it has becomes customary that such compact disc are recorded at a high density and reproduced at a high transfer rate. In order to realize high-density recording and high-transfer rate reproduction, there has heretofore been used a land groove recording format in which pits are formed on both the lands and the grooves of the disc. According to the land groove recording format, a track pitch may be reduced, thereby making it possible to increase a disc recording capacity.

Also, according to the land groove recording format, when address information is recorded on the disc, the same address information is recorded on an adjacent land and a groove and one of two laser beams is wobbled in such a manner that data, that was recorded at the same address information, may be read out. A reproducing apparatus having a high transfer rate reproduces data at a high speed by rotating a compact disc, for example, at revolutions higher than 8 times a predetermined revolution number. Such high-transfer rate reproducing apparatus is able to reproduce data of the same amount in quite a short period of time as compared with the normal one time.

Figure 1:
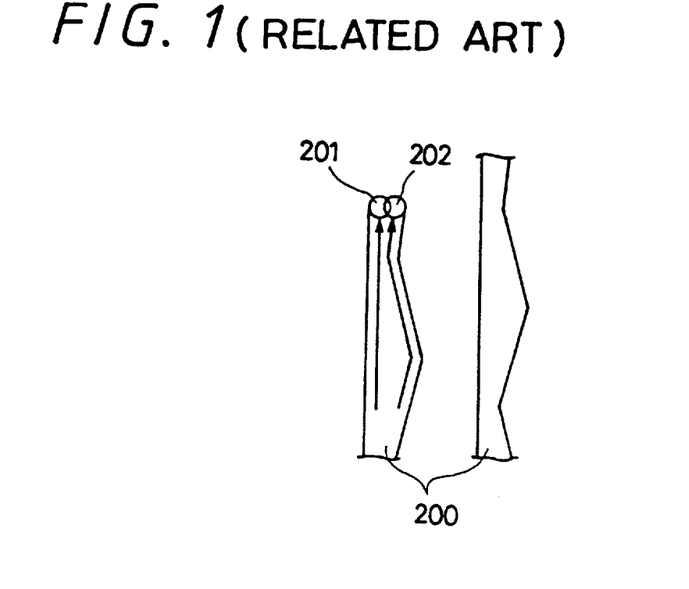
FIG. 1 is a diagram used to explain the manner in which one of two laser beams is wobbled when depressions are formed on the groove by using two laser beams according to the prior art.
Figure 2:
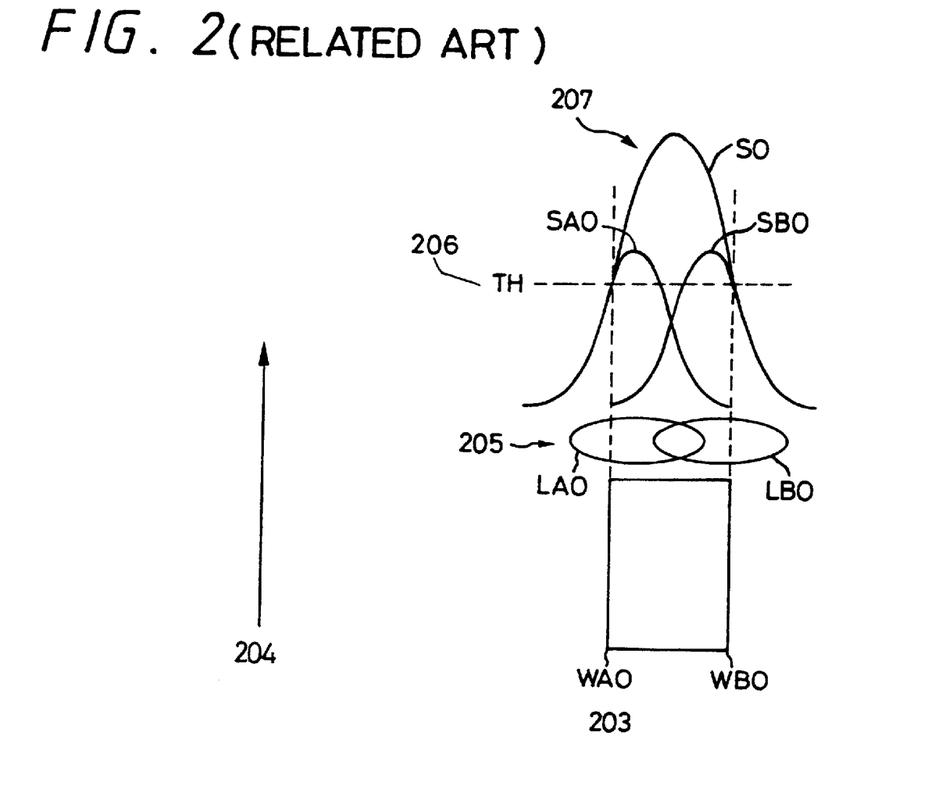
FIG. 2 is a diagram used to explain a light intensity of two laser beams and a disc exposed state according to the prior art.

As shown in FIG. 1, when a disc is manufactured, the groove is cut by using spots 201, 202 of two laser beams. When one of the two laser beam is wobbled, a distance between the two laser beams and the laser powers of the two laser beams have to be adjusted with high accuracy in such a manner that the spot 202 of the wobbled laser beams may not invade the spot 201 of the other laser beam which is not wobbled. To this end, the sizes of the laser beams for use in cutting should be calculated from the distance between the two laser beams relative to the determined groove width. However, as shown in FIG. 2, two laser beams 205 (LA0, LB0) have beam intensity distributions (SA0, SB0, added distribution S0), and hence widths (WA0 to WB0) of the groove 203 are determined by a combination of the beam intensity distributions and disc exposure conditions such as an exposure threshold 206 (TH) in a disc cutting direction 204. Even though the adjusted beam distance and light intensity are calculated by the above-mentioned factors, when address information is recorded on the groove by wobbling one of the two laser beams, the light intensity of one laser beam is added to the other laser beam, which is not wobbled, by the wobbled amount so that the groove, which should not be modulated by the other laser beam, is modulated by the influence of the offset. As a consequence, upon reproduction, the offset signal is superimposed upon the reproduced signal. There is then the disadvantage that address information cannot be reproduced at a high accuracy.

SUMMARY OF THE INVENTION

In view of the aforesaid aspect, it is an object of the present invention to provide an optical information recording medium, an optical information recording method and an optical information recording apparatus in which the other laser beam may be protected from being affected by an offset of one laser beam and a signal may be stably decoded upon high-density recording.

According to an aspect of the present invention, there is provided an optical information recording apparatus for forming a groove whose one side is wobbled or is formed on an optical recording medium by turning on or off one of two laser beams in accordance with a modulation signal. This optical information recording apparatus comprises a device for wobbling the one laser beam controlled on or off in such a manner that the one laser beam may not affect the other laser beam.

According to another aspect of the present invention, there is provided an optical information recording method in which a groove whose one side is wobbled or modulated is sequentially formed on an optical recording medium by turning on or off one of two laser beams in accordance with a modulation signal and desired data is recorded by the groove. This optical information recording method is characterized in that the one laser beam controlled on or off is wobbled in such a manner that the controlled one laser beam may not affect the other laser beam.

In accordance with a further aspect of the present invention, there is provided an optical information recording medium in which a groove whose one side is wobbled or modulated is sequentially formed on an optical recording medium by turning on or off one of two laser beams in accordance with a modulation signal and desired data is recorded by the groove. This optical information recording medium is characterized in that a groove is formed by wobbling the one laser beam controlled on or off in such a manner that the one laser beam may not affect the other laser beam.

The optical information recording apparatus of the present invention acts as follows.

In the optical information recording apparatus, when one side of groove is wobbled by one laser beam in accordance with a modulation signal, the one laser beam acts in such a manner that a light intensity of the one laser beam is not added to a light intensity of the other laser beam of the other side, which is not wobbled, by a wobbled amount. Thus, the other side of the groove which should not be modulated inherently may be protected from being affected by the offset. Also, one side of the groove is wobbled by one laser beam of two laser beams, whereby adjacent land and groove may have a shared address.

The optical information recording method according to the present invention acts as follows.

In the optical information recording method, when one side of groove is wobbled by one laser beam in accordance with a modulation signal, the one laser beam acts in such a manner that a light intensity of the one laser beam is not added to a light intensity of the other laser beam on the other side of groove, which is not wobbled, by a wobbled amount. Thus, the groove of the other side which should not be modulated may be protected from being affected by the offset. Also, one side of two laser beams is wobbled, whereby adjacent land and groove may form a shared address. Thus, a redundancy in information recording may be lowered.

The optical information recording medium according to the present invention acts as follows.

When an optical information recording medium is manufactured, one laser beam acts in such a manner when one side of groove is wobbled by the one laser beam in accordance with a modulation signal, that a light intensity of the one laser beam is not added to a light intensity of the other laser beam, which is not wobbled, by a wobbled amount. Thus, the other side of groove which should not be modulated may be protected from being affected by the offset. Also, since one side of two laser beams is wobbled, adjacent land and groove may form a shared address. Thus, there may be provided the optical information recording medium in which a redundancy in information recording may be lowered.

BRIEF DESCRIPTION OF THE DRAWINGS

FIGS. 5A to 5C are schematic perspective views used to explain a structure of an optical disc according to an embodiment of the present invention, wherein FIG. 5A shows a signal recording area of an optical disc, FIG. 5B shows grooves and FIG. 5C shows pits;

FIGS. 6A to 6C are schematic perspective views used to explain an exposure process of an optical disc master according to an embodiment of the present invention, wherein FIG. 6A shows a glass master, FIG. 6B shows a photoresist and FIG. 6C shows an exposure treatment;

FIGS. 7A to 7D are diagrams used to explain an optical disc master development process and a stamper according to an embodiment of the present invention, wherein FIG. 7A shows a groove on which a photoresist layer is exposed, FIG. 7B shows a pit on which a photoresist layer is exposed, FIG. 7C shows a manner in which a stamper is formed and FIG. 7D shows a manner in which a disc base (replica base) is formed;

DESCRIPTION OF THE PREFERRED EMBODIMENTS

The present invention will hereinafter be described with reference to the drawings.

Figure 3:
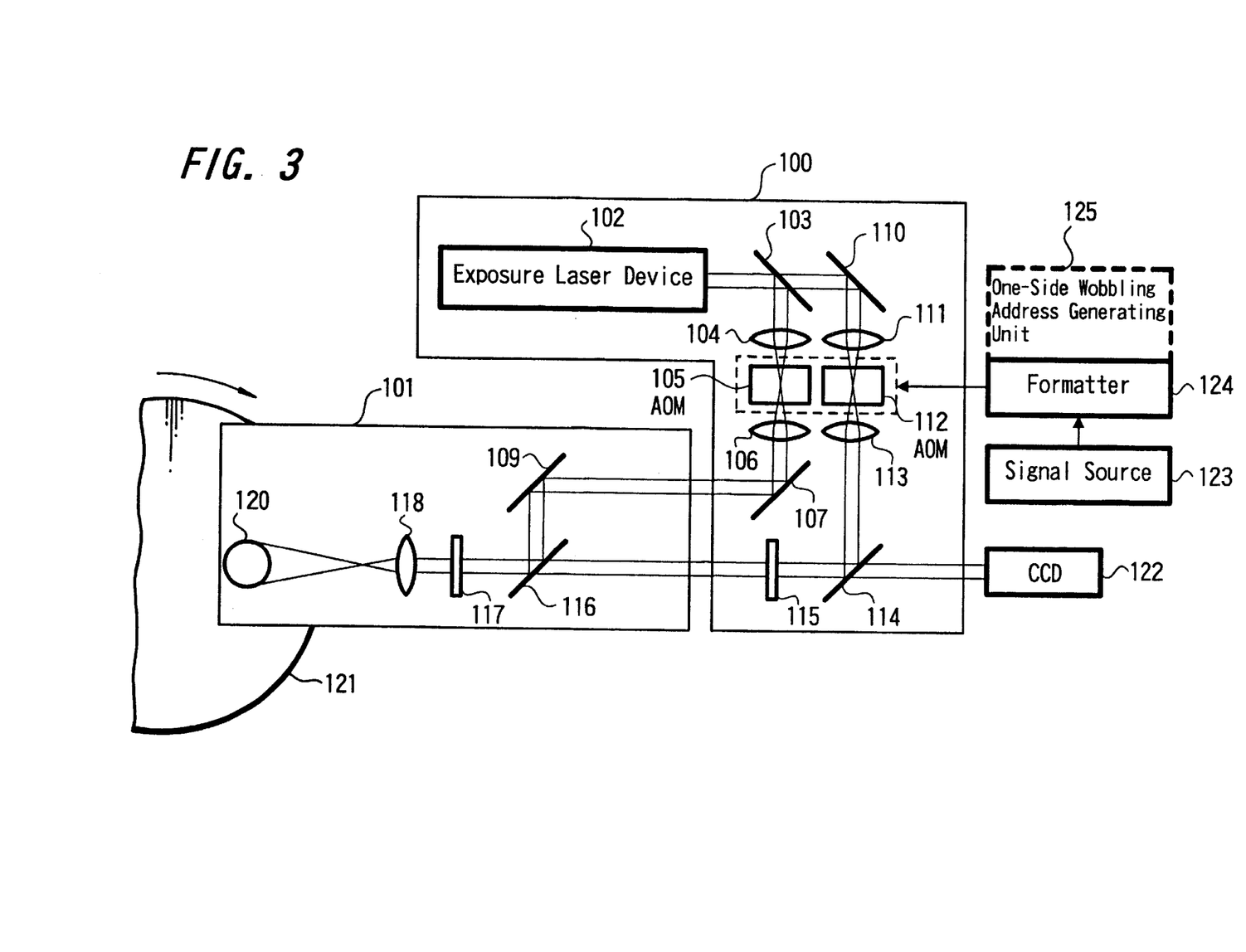
FIG. 3 is a diagram showing a disc cutting apparatus according to an embodiment of the present invention.

FIG. 3 is a block diagram showing a disc cutting apparatus according to an embodiment of the present invention. As shown in FIG. 3, in this disc cutting apparatus, a glass master 121 is exposed and information is recorded on the exposed glass master 121 by a laser beam modulated by a modulation signal formatted by a formatter 124 based on audio data or the like supplied from a signal source 123 after laser beams had been emitted from an exposure laser device 102. In an optical disc manufacturing process, a mother disc is produced by electroforming the developed glass master 121, and a stamper is produced from the mother disc. Further, in the optical disc manufacturing process, a disc-like base is produced from the stamper thus produced, and a compact disc is produced by forming a reflection film and a protection film on this disc-like base, which will be described below in detail.

This disc cutting apparatus includes an optical system capable of modulating a laser beam for exposure at high speed and deflecting the laser beam with a sufficient amplitude. This disc cutting apparatus includes a light path in which a laser beam emitted from the exposure laser device 102 serving as an exposure light source and split by a beam splitter 103, which splits a light path, is modulated by an acoustooptic effect modulator (hereinafter simply referred to as "AOM") 105 and a light path in which the laser beam is modulated and deflected by an AMO 112.

When a laser beam is not deflected by this disc cutting apparatus, the laser beam emitted from the exposure laser device 102 is reflected by a reflecting mirror 110 installed on a fixed optical table 100, converged by a lens 111 and modulated by the AOM 112. A diffused laser beam obtained after it had been modulated by the AOM 112 is collimated by a collimator lens 113, reflected by a beam splitter 114, traveled through a quarter-wave plate 115, traveled through a deflection beam splitter 116 and a quarter-wave plate 117 installed on a slide optical table 101, converged by a condenser lens 118, and then converged by an objective lens 120 to expose the glass master 121. The quarter-wave plates 115, 117 are disposed in order to prevent the light from being returned to the light source side.

When a laser beam is deflected by this disc cutting apparatus, a laser beam emitted from the exposure laser device 102 is reflected by the beam splitter 103 installed on the fixed optical table 100, converged by a condenser lens 104 and modulated and deflected by the AOM 105. This AOM 105 is disposed with a displacement from the focusing plane of the condenser lens 104 to the light source side. Specifically, the focal length of the condenser lens 104 is 80 mm, and the AOM 105 is located with a displacement of 10 mm from the focusing plane of the condenser lens 104 to the light source side.

A diffused laser beam obtained after it had been modulated by the AOM 105 is collimated by a collimator lens 106, reflected by a reflecting mirror 107, reflected by a reflecting mirror 109 and the deflection beam splitter 116 disposed on the slide optical table 101, traveled through a quarter-wave plate 117, converged by the condenser lens 118 and then converged by the objective lens 120 to expose the glass master 121.

Also, the beam splitter 114 guides a part of laser beam modulated by the AOM 112 into a CCD (charge-coupled device) 122, in which it is monitored.

In the disc cutting apparatus according to this embodiment, as a device for supplying a modulation signal for modulating the laser beams emitted from the exposure laser device 102 by the AOMS 105, 112, there is provided the formatter 124 for generating a track format by adding a one-side wobbling address, generated from a one-side wobbling address generating unit 125, to a signal from the signal source 123.

In the disc cutting apparatus for forming a groove whose one-side is modulated on an optical recording medium by turning on or off one laser beam of two laser beams in accordance with a modulation signal, the one-side wobbling address generating unit 125 has a function to wobble one controlled laser beam controlled on or off in such a manner that the one laser beam may not affect the other laser beam.

Also, in the above-mentioned disc cutting apparatus, the one-side wobbling address generating unit 125 has a function to wobble one laser beam controlled on or off in such a manner that the one laser beam may become away from the other laser beam.

Moreover, in the above-mentioned disc cutting apparatus, the one-side wobbling address generating unit 125 has a function to stepwise increase or decrease a light intensity of the one laser beam when the one laser beam is turned on or off.

Figure 4:
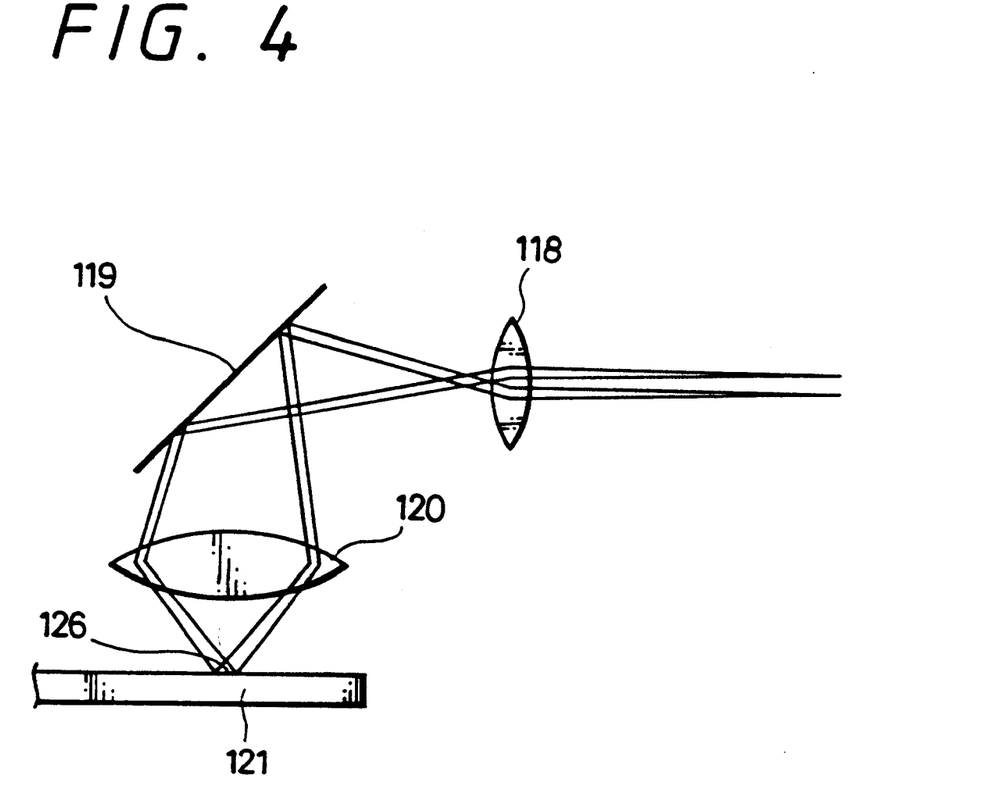
FIG. 4 is a side view of an optical system on a slide optical carriage according to an embodiment of the present invention.

FIG. 4 is a side view of the optical system on the slide optical table 101 of the above-mentioned disc cutting apparatus. The laser beam converged by the condenser lens 118 is downwardly reflected by a reflecting mirror 119 and converged by the objective lens 120 on a focusing point 126 on the glass master 121.

Since the glass master 121 is rotated on a turntable (not shown) at a predetermined rotation speed, the glass master 121 is exposed in a spiral-fashion by sliding the slide optical table 101 in parallel to the radius direction of the glass master 121.

Figure 5A:
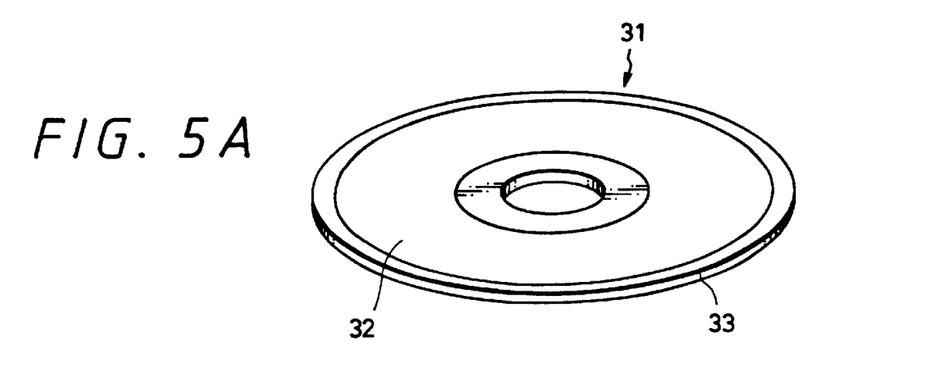
Figure 5B:
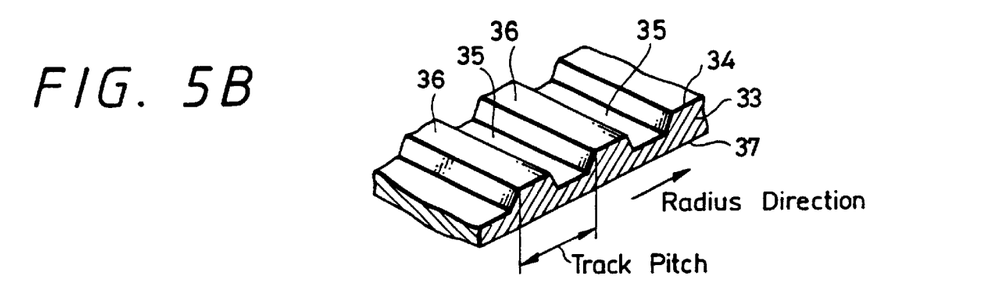
Figure 5C:
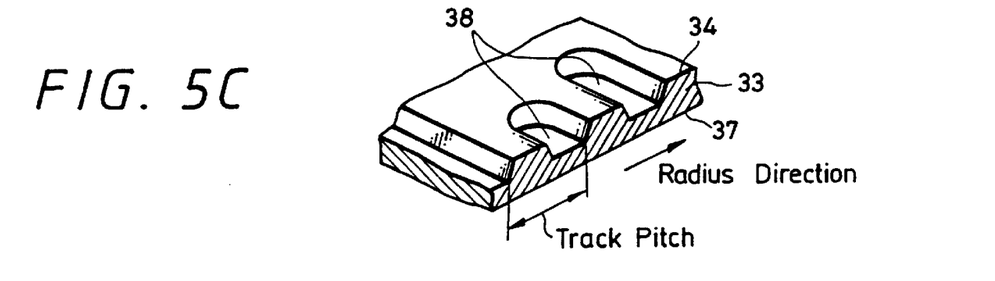

FIGS. 5A to 5C are diagrams used to explain a structure of an optical disc produced by the above-mentioned disc cutting apparatus. In a signal recording area 32 of an optical disc 31 shown in FIG. 5A, rows of grooves 35 used as guide grooves or rows of continuous pits 38 are spirally formed on one surface (signal surface) 34 of an optically-transparent plastic disc base 33 at a predetermined track pitch P of about 1 to 2 μm. FIG. 5B shows the grooves 35, and FIG. 5C shows the pits 38, respectively. It is frequently observed that the rows of the grooves 35 or the rows of the pits 38 are periodically wobbled in the radius direction of the optical disc 31. In particular, in this embodiment, the grooves whose one-sides are modulated respectively are progressively formed by turning on or off one laser beam of two laser beams in accordance with the modulation signal on an optical disc in which desired data is recorded by the grooves, the grooves are formed by wobbling one laser beam controlled on or off in such a manner that the one laser beam may not affect the other laser beam.

In a phase-change type optical disc and a magnetooptical disc which are writable optical discs, it is customary that one (e.g. land 36) of uneven shapes, which are transferred from a mastering original disc to the signal surface 34, is used as a recording area and the other (e.g. groove 35) is used as a tracking light reflection area. When rows of grooves 35 or pits 38 are formed by wobbling, its periodical change is used as address information on the whole surface of the optical disc 31. Also, in a formatted or reproduction only optical disc, it is customary that the rows of the pits 38 on the signal surface 34 are used as the recording areas and the tracking diffraction gratings.

On the signal surface 34 in which the grooves 35 are formed, there are also formed a recording layer, a light reflection layer, a protection layer or the like made of a phase-change film or a magnetic film although not shown.

When a signal is recorded on or reproduced from this optical disc 31, an optical pickup irradiates a laser beam on a read-out surface 37 which is the opposite surface of the signal surface 34 while the optical disc 31 is being rotated. When the optical disc 31 is a writable optical disc, a signal is optically written on the recording layer of the land 36, for example, by the irradiated laser beam. The signal that was optically written in the optical disc 31 is read out from the optical disc 31 by the reflected laser beam.

A tracking control is effected by detecting reflected light from the groove 35, for example, in such a manner that a recording or reproducing laser beam may constantly be irradiated on a predetermined track. In the formatted optical disc, a signal is read out from the formatted optical disc and the tracking is effected by detecting a laser beam irradiated on the read-out surface 37 as reflected/diffracted laser beam from the signal surface 34 on which the rows of the pits 38 are formed.

Since the performance of the recording medium depends upon the shapes of the concavities and convexities on the signal surface of the optical disc, it is requested that the shapes of such concavities and convexities should be transferred with a high accuracy from the mastering original disc to the optical disc base.

Figures 6A, 6B:
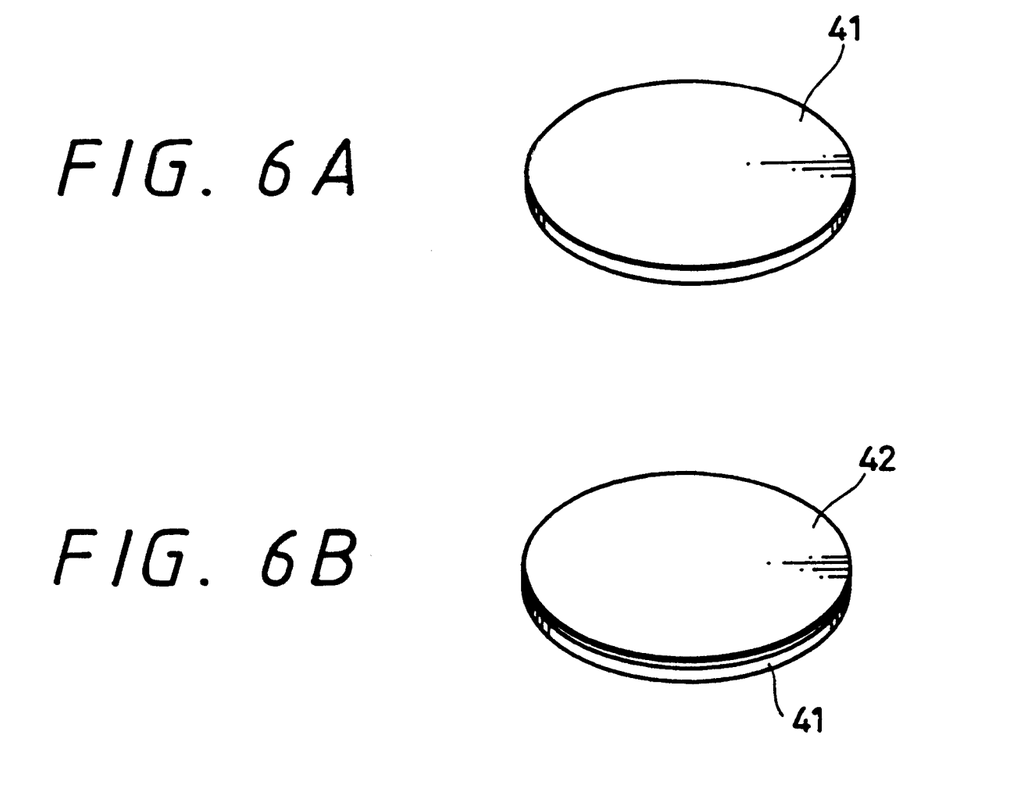

FIGS. 6A to 6C schematically illustrate the process for producing the mastering original disc of the optical disc. Initially, there is prepared a circular glass master (glass base) 41 the surface of which is sufficiently made flat, polished and cleaned as shown in FIG. 6A. Then, as shown in FIG. 6B, an exposure material (photoresist) 42 which becomes soluble to an alkaline solution by exposure is coated on the glass master 41. In general, this coating process is executed by a spinner rotational coating method, and the photoresist layer 42 has a thickness of approximately 0.1 μm.

Figure 6C:
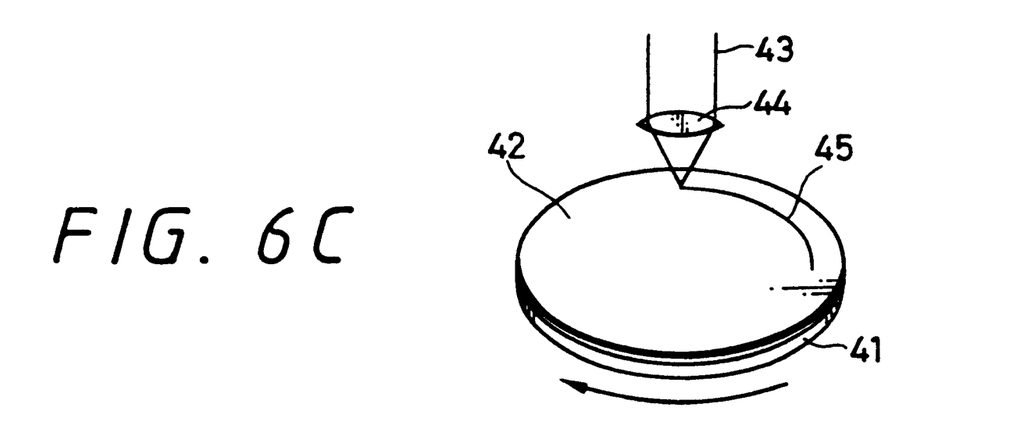

Then, as shown in FIG. 6C, a signal recording laser beam 43 is focused by a lens 44 to expose the photoresist layer 42.

At that time, while the glass master 41 is being rotated, the laser beam 43 is moved in the radius direction of the glass master 41 with an equal distance per revolution, whereby a latent image 45 of groove may be spirally formed on the photoresist layer 42 at a constant distance (track pitch P). Also, at that time, if the laser beam 43 is intermittently irradiated on the photoresist layer 42, the latent image 45 of pit rows may be similarly formed on the photoresist layer 42. Further, the focused point of the laser beam 43 is periodically deflected in the radius direction, the latent image of the groove or pit rows may be wobbled. In particular, according to this embodiment, in an optical information recording method in which a groove whose one-sides is wobbled or modulated is sequentially formed on the optical recording medium by turning on or off one laser beam of two laser beams in accordance with a modulation signal and desired data may be recorded by the groove, the one laser beam controlled on or off is wobbled in such a manner that it may not affect the other laser beam.

The exposure is effected by the above-mentioned laser cutting apparatus, i.e. the laser light source for exposing the photoresist layer 42 on the glass master 41 to record a signal, the optical modulator for modulating a laser beam in response to a signal to be recorded, the optical system for focusing laser beam on the photoresist layer 42, the optical table for rotating the glass master 41 and moving the exposed position and so on.

FIGS. 7A to 7D show the process in which the glass master treated by the above-mentioned exposure (laser cutting) is developed by an alkaline developer and an alkaline soluble exposed portion of the photoresist layer 42 is solved and removed.

Figure 7A:
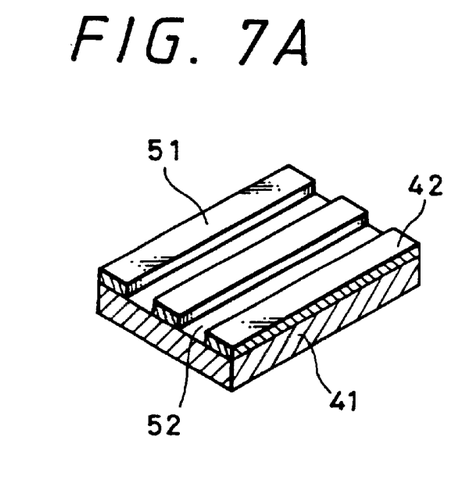
Figure 7B:
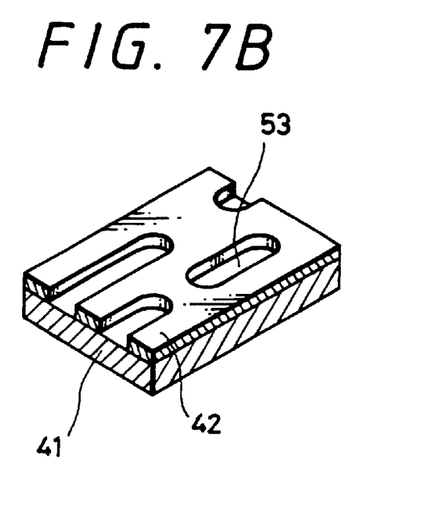

FIGS. 7A and 7B each illustrate developed glass masters 41. FIG. 7A shows a writable optical disc master in which a groove 52, from which the exposed photoresist layer 42 is dissolved and removed, and a land 51, which is a remaining convex portion between the grooves 52, are alternately formed in the radius direction of glass master 41. FIG. 7B shows a formatted optical disc master in which rows of continuous pits 53, from which the exposed photoresist layer 42 is dissolved and removed are repeated formed in the radius direction of the glass master 41.

Figure 7C:
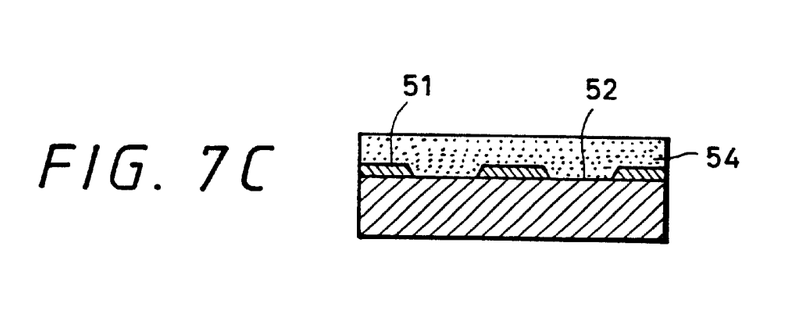

Then, as shown in FIG. 7C, the glass master 41 in which concavities and convexities are formed on the photoresist layer 42 by development is plated by nickel (Ni) and a stamper 54 in which the rows of the grooves 52 or the rows of the continuous pits 53 of the photoresist layer 42 are transferred is produced.

Figure 7D:
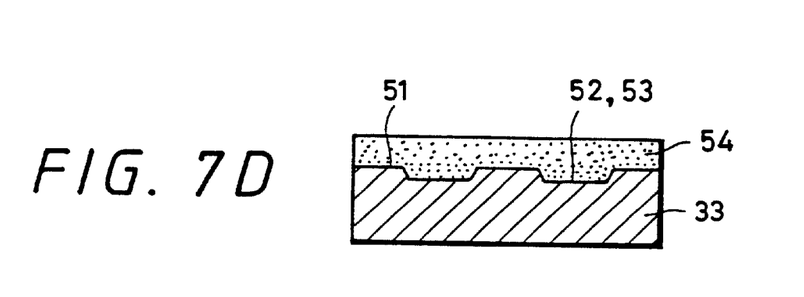

Then, as shown in FIG. 7D, the concave and convex shapes of the stamper 54 are transferred to the plastic base material of the optical disc by a suitable method such as injection molding or the like, thereby producing a disc base (replica base) 33 having the grooves 52 and the lands 52 or the rows of the pits 53.

Incidentally, in the replica base 33 of the recordable optical disc, a recording film, a reflection film and a protection film are further deposited on the signal surface 34 on which the grooves 52 are formed. Also, in the replica base 33 of the formatted optical disc, a reflection film and a protection film are further deposited on the signal surface 34 of the disc base 33 on which the pits 53 are formed.

When the above-mentioned optical disc master is produced, an AOM (acoustooptic modulator) is used as a device for switching the exposure of the photoresist 42 on the glass master 41 on and off. Also, an AOD (acoustooptic deflector) is used as device for deflecting an exposure laser beam in order to wobble the exposed position of the photoresist layer 42 in the radius direction of the optical disc. Structures and operation principles of such AOM and AOD will be described below.

Figure 8:
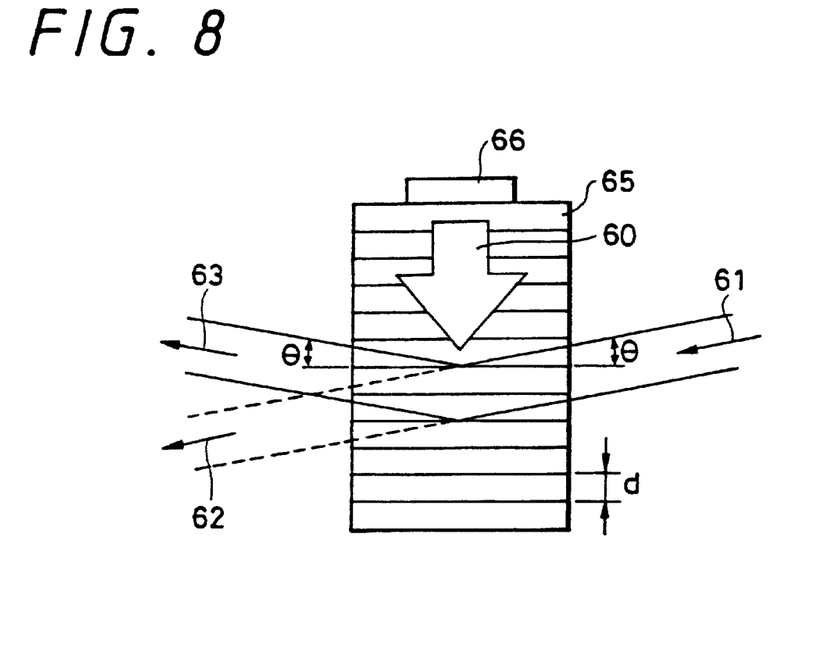
FIG. 8 is a diagram used to explain a structure of an acoustooptic effect element and an operation principle thereof according to an embodiment of the present invention.

FIG. 8 is a diagram showing a structure and an operation principle of the acoustooptic effect element. That is, when an ultrasonic vibrator 66 attached to an optical crystal 65 is driven so that an ultrasonic wave 60 is introduced into the optical crystal 65 and propagated therein, a periodic refractive index change corresponding to a wavelength and an intensity of the ultrasonic wave 60 is generated and propagated in the inside of the optical crystal 65. Relative to a phase-type diffraction grating of a grating space d that is substantially formed by waves of the periodic refractive index change, a light 61 incident at an angle (which satisfies Bragg diffraction condition is Bragg-diffracted. Incidentally, the ultrasonic wave 60 propagated in the optical crystal 65 is absorbed by an ultrasonic absorption material (not shown) so as to remove an influence caused by its reflection.

An intensity of first-order diffracted light 63 that is Bragg-diffracted by the optical crystal 65 depends upon the intensity of the ultrasonic wave 60. That is, when the intensity of the ultrasonic wave 60 is low, most of incident light 61 becomes non-diffracted light (transmitted light) 62. When the intensity of the ultrasonic wave 60 is high, most of the incident light 61 becomes the first-order diffracted light 63.

The AOM makes effective use of this action, and is able to select the existence or absence of the first-order diffracted light 63 by turning on or off the ultrasonic wave 60 applied to the optical crystal 65. That is, if the intensity of the ultrasonic wave 60 is modulated by intermittently driving the ultrasonic vibrator 66 in response to a recording signal and the first-diffracted light 63 emitted from the optical crystal 65 at that time is used as master exposure light, then pit rows corresponding to the recording signal may be exposed to and formed on the master. In the following description, "modulation including an operation for controlling the existence or absence of diffracted light from the AOM" also is referred to as "modulation".

The diffraction angle θ of the optical crystal 65 depends upon a frequency (carrier frequency) of the ultrasonic wave 60. That is, if the incident angle of the incident light 61 is made constant and the carrier frequency is changed, then the diffracted light may be emitted at the angle ( satisfying the Bragg diffraction condition.

The AOD makes effective use of this action, and is able to control the emitting direction of the first-order diffracted light 63 by changing the frequency of the ultrasonic wave 60 applied to the optical crystal 65. That is, the frequency of the ultrasonic wave 60 is periodically changed by periodically changing the frequency at which the ultrasonic vibrator 66 is driven. Then, the direction of the first-order diffracted light 63 emitted from the optical crystal 65 is changed periodically. If the first-order diffracted light 63 which is deflected periodically is used as the master exposure light, then grooves and pit rows formed on the master by exposure may be wobbled.

Figure 9:
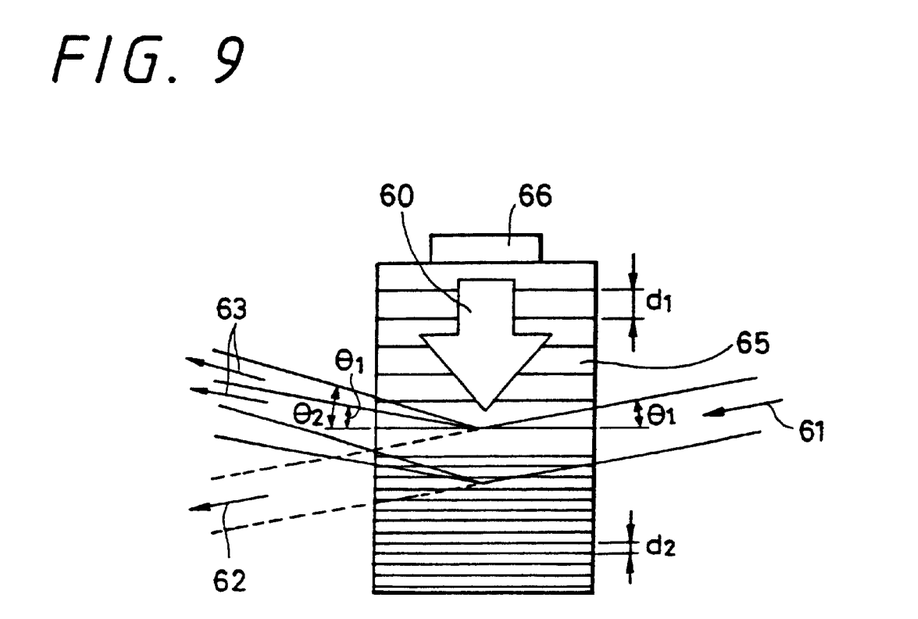
FIG. 9 is a diagram used to explain the manner in which a refractive index wave period is changed with a position in an optical crystal of an acoustooptic effect element according to an embodiment of the present invention.

FIG. 9 is a diagram schematically showing the manner in which the period of wave of the refractive index change is changed dependent on the position in the optical crystal of the acoustooptic effect element.

When the frequency (carrier frequency) of the ultrasonic wave 60 applied by the ultrasonic vibrator 66 is constant, the refractive index wave constantly exists in the optical crystal 65, so that the direction in which the first-order diffracted light 63 is emitted is determined uniquely. However, when the carrier frequency of the ultrasonic wave 60 is changed from a time standpoint in order to periodically deflect laser beam, the ultrasonic wave 60 is propagated within the optical crystal 65 so that the period of the refractive index wave of the whole of the optical crystal 65 is changed to other period, requiring a certain period of time. That is, at that time, then period of the refractive index wave in the optical crystal 65 is changed dependent on the position. In addition, as the deflection speed (frequency) increases, an area in which the change of the refractive index becomes constant in the optical crystal 65 is narrowed.

For example, if a compression wave having a space d1 and a compression wave having a space d2 exist within the light path of the optical crystal 65 through which the incident light 61 having a certain wavelength travels, then as shown in FIG. 9, this is equivalent to the fact that there exist a diffraction grating having a grating space d1 and a diffraction grating having a grating space d2 in the optical crystal 65. As a consequence, the first-order diffracted light 63 is emitted at the diffraction angle θ1 which satisfies the Bragg diffraction condition from the diffraction grating having the grating space d1. Similarly, the first-order diffracted light 63 is emitted at the diffraction angle θ2 from the diffraction grating having the grating space d2. This phenomenon is referred to as a cylindrical effect.

Referring back to FIG. 3, according to this embodiment, the condenser lens and the AOM are located as follows. That is, the AOM 105 is located with a small displacement from the focusing position of the condenser lens 104. Thus, the laser beam incident on the AOM 105 is focused by the lens 104 and has a small diameter, so that the laser beam may be modulated at high speed. At the same time, the AOM 105 may deflect the laser beam.

When the amplitude in which the grooves or pit rows are wobbled on the master should be sufficiently large and the wobbling frequency may be made low, it is sufficient that the AOM 105 is located with a large displacement from the focusing position of the condenser lens 104 in the optical axis direction. Furthermore, when the grooves or the pit rows should be wobbled on the master at high speed and the amplitude in which the grooves or the pit rows are wobbled on the master may be made small, the AOM 105 may be disposed at the position near the focusing position of the condenser lens 104.

In the optical information recording apparatus using the above-mentioned disc cutting apparatus and in which one laser beam of two laser beams is controlled to be modulated so as to form wobbling and the other laser beam is not modulated bypassing the route with no above-mentioned modulator such that the groove whose one-side is modulated only is formed on the optical recording medium by turning one or off the one laser beam of two laser beams in accordance with the modulation signal, the one laser beam controlled on or off is wobbled such that the one laser beam may not affect the other laser beam.

Specifically, in this optical disc cutting apparatus, the spindle motor (not shown) rotates the glass master 121, and the FG signal generating circuit held at the bottom of the spindle motor outputs the FG signal FG whose signal level rises at every predetermined rotation angle. The spindle servo circuit drives the spindle motor in response to the exposure position of the glass master 121 in such a manner that the frequency of this FG signal FG reaches a predetermined frequency. Thus, the spindle motor rotates the glass master 121 at a predetermined rotational speed. Incidentally, in this embodiment, it is popular to use a ZCAV (zone constant angular velocity) mode in which a recording and reproducing frequency is sectioned at every specific radius area and a recording and reproducing clock is changed at every disc zone. The present invention is not limited to the ZCAV mode but may be similarly applied to a CAV (constant angular velocity) mode in which the spindle motor is driven at a constant angular velocity.

The exposure laser device 102 is comprised of a gas laser device or the like to emit an exposure laser beam to the glass master 121. The AOM optical modulator is comprised of the electroacoustic optical element to turn on or off the laser beam in response to the modulation signal. The above-mentioned optical system folds the light path of this laser beam to emit the laser beam to the glass master 121. The objective lens 120 focuses the laser beam, guided by this optical system, on the glass master 121. The optical system and the objective lens 120 are progressively moved by a sled mechanism (not shown) in the outer peripheral direction of the glass master 121 in synchronism with the rotation of the glass master 121, whereby the exposed position of the laser beam is progressively displaced to the outer peripheral direction of the glass master 121.

Thus, in this optical disc cutting apparatus, under the condition that the glass master 121 is being rotated, a spiral-like track is formed by moving the optical system and the objective lens 120 and the grooves or the pits are sequentially formed on the track in response to the modulation signal.

In this manner, the modulation signal is supplied to the optical modulator, and the optical disc master is exposed by the laser beam similarly to the case in which an ordinary compact disc is produced.

As described above, in the optical disc in which on the whole surface of the glass master 121 produced by recording the glass master 121 when the output laser beam is turned on or off by the optical modulator, there are sequentially formed grooves whose one-side are wobbled by turning on or off one laser beam of two laser beams in response to the modulation signal and desired data is recorded by the grooves, the grooves are formed by wobbling the one laser beam controlled on or off in such a manner that the one laser beam may not affect the other laser beam, thereby resulting in the optical disc master being produced.

After the optical disc master thus exposed is developed, the mother disc is produced by electroforming the developed optical disc master, and the stamper is produced from this mother disc. Further, the optical disc is produced from this stamper similarly to the ordinary compact disc producing process.

Figure 10:
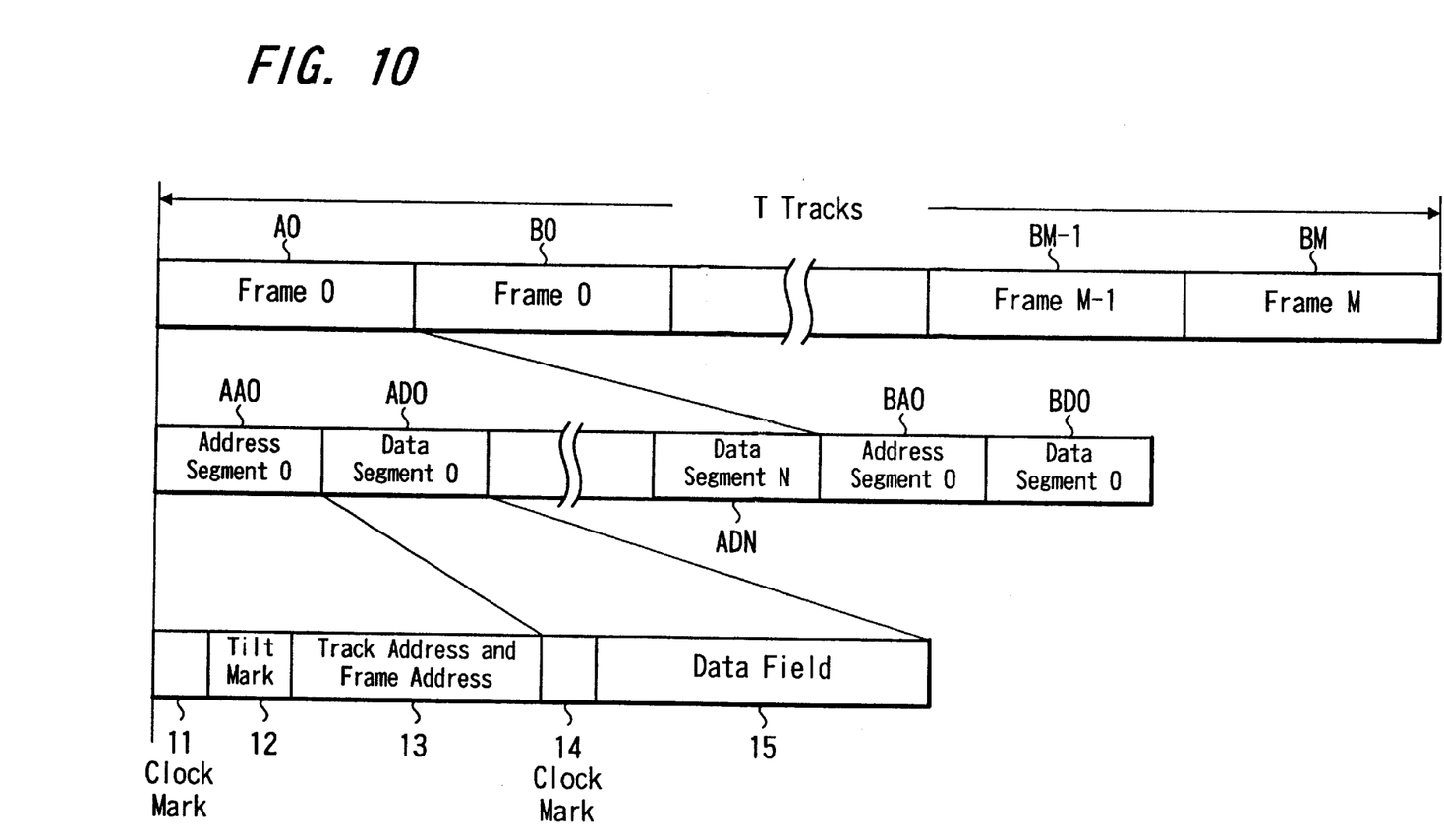
FIG. 10 is a diagram showing a track format according to an embodiment of the present invention.

A track format in which the signal from the signal source 123 is formatted by the formatter 124 shown in FIG. 3 will be described with reference to FIG. 10.

In this embodiment, the ZCAV in which the recording and reproducing frequency is sectioned at every specific radius area and the recording and reproducing clock is varied at every disc zone will be described. As shown in FIG. 10, one track T is divided to provide M frames, and the number of frames becomes different in the zones. For example, a zone A comprises only a frame 0 (A0), and a zone B comprises a frame 0 (B0), . . . , a frame M−1 (BM−1), a frame M (BM). Within one zone, frames are radially disposed along the circumference of the disc. The frame is further divided to provide 46 segments. For example, from the start of the frame 0 (A0) of the zone A, the frame is divided to provide an address segment 0 (AA0), a data segment 0 (AD0), . . .

, a data segment N (AND) (here, N=45). From the start of the frame 0 (B0) of the zone B, the frame is divided to provide an address segment 0 (BA0), a data segment 0 (BD0), . . . in this order.

When such address segment information is wobbled by a high-frequency component and recorded on the disc, as compared with the case in which information is recorded by pits, if the high-frequency component (e.g. approximately 100 kHz) is lowered and the tracking is effected, then a low-frequency component (e.g. approximately 1 kHz) of tracking information (clock mark) may be prevented from being affected. Incidentally, on the data segment are recorded information containing data field serving as user data, ECC (error-correction code), phase-adjustment header information and the like.

Then, in the address segment are disposed a track address, a frame address and ECC (not shown) for detecting errors of the track address and the frame address. For example, in the address segment 0 (AA0) at the start of the frame 0 (A0) of the zone A are disposed a clock mark 11, a tilt mark 12 and a track address and frame address 13. In the data segment 0 (AD0) of the zone A are disposed a clock mark 14 and a data field 15. The clock marks 11 and 14 are used to generate clocks required when data is reproduced. Although not shown, a margin data area for preventing previous data from being left in the overwrite and a margin data area capable of absorbing an amount in which a position is shifted when a recording power of exposure laser beam is fluctuated are provided ahead of and behind the clock mark. The tilt mark 12 is used to prevent an offset from being caused by a disc tilt by detecting a disc inclined amount and by feeding back this detected disc inclined amount.

In this embodiment, on the track address and frame address 13 is recorded an optical disc address for controlling one laser beam of two laser beams. The track address and frame address 13 is generated by the one-side wobbling address generating unit 125 of the track formatter 124 shown in FIG. 3.

The manner in which the disc is exposed by wobbling one laser beam of two laser beams based on the track address and frame address 13 generated from the above-mentioned one-side wobbling address generating unit 125 will be described with reference to FIGS. 11A to 11C.

Figure 11A:
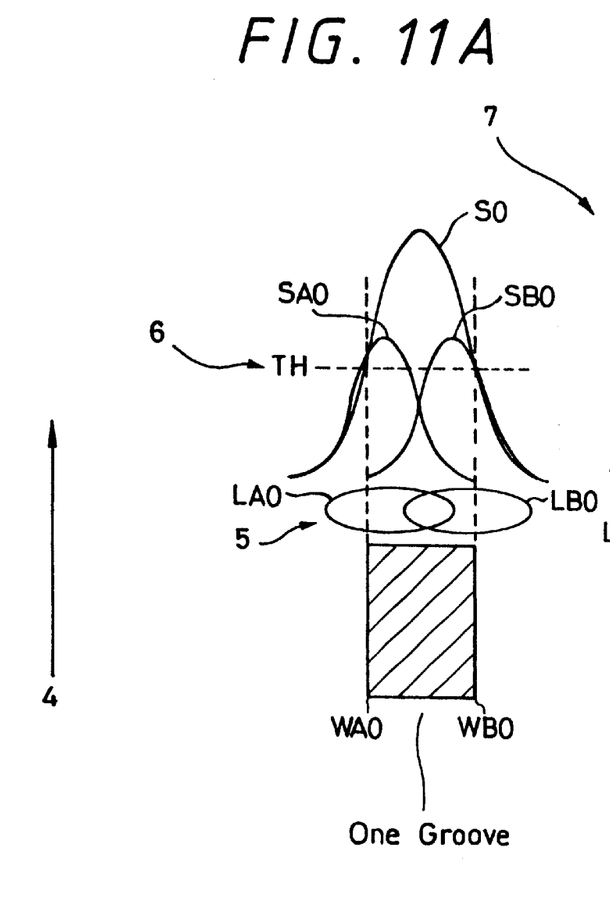
FIGS. 11A to 11C are diagrams showing a light intensity of laser beams based on two-beam system and a disc exposed state according to an embodiment of the present invention.

As shown in FIG. 11A, two laser beams 5 (LA0, LB0) include a beam intensity distribution 7 (SA0, SB0, added distribution S0), and a width (WA0 to WB0) of a groove 1 is determined by a combination of the beam intensity distribution 7 and a disc exposure condition such as an exposure threshold 6 (TH) or the like in a disc cutting direction.

Figures 11B, 11C:
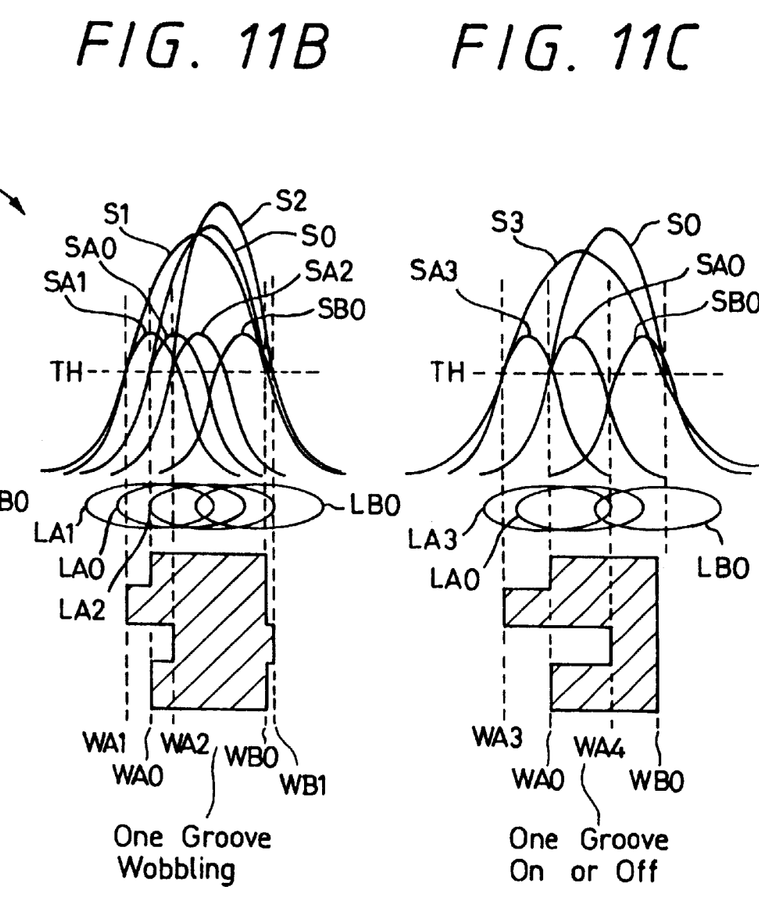

In a first one-side wobbling disc exposure method, as shown in FIG. 11B, when one laser beam LA0 of the two laser beams 5 (LA0, LB0) is wobbled to LA1 or LA2, the beam intensity distribution SA1 corresponds to the laser beam LA1, and the beam intensity distribution SA2 corresponds to the laser beam LA2. A synthesized distribution of the beam intensity distributions SA0 and SB0 is S0, a synthesized distribution of the beam intensity distributions SA1 and SB0 is S1, and a synthesized distribution of the beam intensity distributions SA2 and SB0 is S2. Then, the width (WA0 to WB0) of the groove 1 is determined in response to the exposure threshold 6 (TH) in the disc cutting direction 4 of the synthesized distribution S0. Similarly, the width (WA1 to WB0) of the groove 1 is determined in response to the synthesized distribution S1, and the width (WA2 to WB1) of the groove 1 is determined in response to the synthesized distribution S2.

Since the beam space, i.e. groove width is controlled by the combination of light intensities of two laser beams as described above, when address information is recorded by wobbling one laser beam of two laser beams, if the laser beam to be wobbled is wobbled in the direction away from the other laser beam which is not wobbled, then the light intensity of one laser beam is not added to the light intensity of the other laser beam which is not wobbled by the wobbled amount. Thus, it is possible to decrease the influence of the offset exerted upon the other-side groove that should not be modulated.

In a second one-side wobbling disc exposure method, as shown in FIG. 1C, when one laser beam LA0 of the two laser beams 5 (LA0, LB0) is turned on and wobbled to a laser beam LA3, the beam intensity distribution SA3 corresponds to the laser beam LA3. A synthesized distribution of the beam intensity distributions SA0 and SB0 is S0 and a synthesized distribution of the beam intensity distributions SA3 and SB0 is S3. Then, the width (WA0 to WB0) of the groove 1 is determined in response to the exposure threshold 6 (TH) in the disc cutting direction 4 of the synthesized distribution S0. Similarly, the width (WA3 to WB0) of the groove 1 is determined in response to the synthesized distribution S3, and the width (WA4 to WB0) of the groove 1 is determined in response to the other beam intensity distribution SB0 when one laser beam LA0 of the two laser beams 5 (LA0, LB0) is turned off.

As described above, by turning on or off the wobbled one laser beam LA0 of the two laser beams 5 (LA0, LB0), the light intensity of the one beam is not added to the light intensity of the other laser beam which is not wobbled by the wobbled amount, and the influence of the offset exerted on the other-side groove that should not be modulated may be decreased. Also, by increasing the wobbling amplitude, it is possible to reproduce a reproducing signal efficiently.

Since the edge portion of the groove wobbled by the one laser beam modulated does not become symmetrical with respect to the groove width depending upon the overlapping state of the two laser beams, the optimum condition is to turn on or off the one laser beam under the condition that the one laser beam is distant from the other laser beam by an amount of a half of an effective size of exposed laser beam. In this case, it is needless to say that the wobbled amount of the one laser beam is determined in consideration of the light intensity amount of the other laser beam. Thus, it is possible to maintain the wobbled amount of the maximum beam size.

Figure 12:
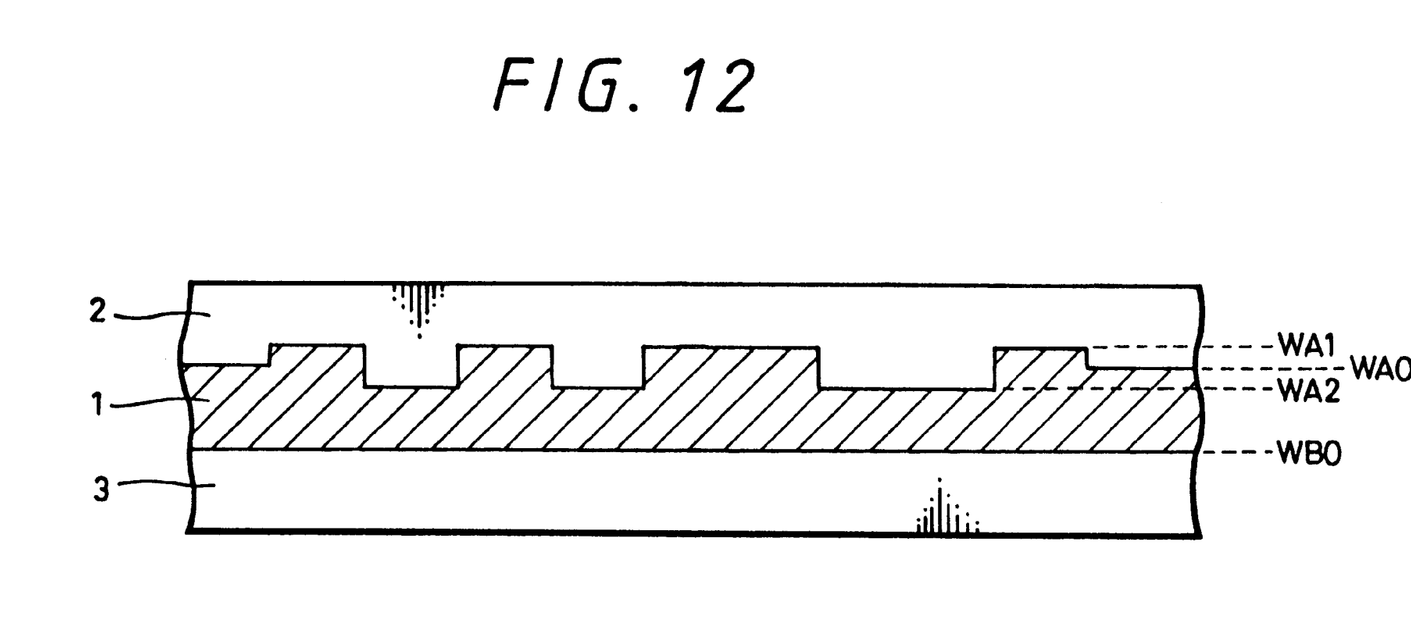
FIG. 12 is a diagram showing the condition that a one-side wobbled (modulated) disc is cut based on the two-beam system according to an embodiment of the present invention.

FIG. 12 is a diagram showing the disc cutting state of the disc obtained by a combination of the first and second one-side wobbling disc exposure methods. As shown in FIG. 12, by turning on one laser beam when the edge portion of one side (upper side in FIG. 12) of the groove 1 in the disc cutting direction (right-hand direction in FIG. 12) is wobbled in the direction WA1 away from the other edge portion WB0 with respect to the width (WA0 to WB0) of the groove 1 and by turning off the one laser beam when the above-mentioned edge portion is wobbled in the direction WA2 approaching the other edge portion WB0, the light intensity of the one layer beam is not added to the light intensity of the other laser beam which is not wobbled by the wobbled amount, and the influence of the offset exerted on the other-side of groove that should not be modulated may be decreased. Also, by increasing the wobbling amplitude, it is possible to reproduce a reproducing signal efficiently.

As described above, by modulating the one side of the groove, it becomes possible to reproduce the same address information of opposite polarity as seen from the adjacent 1 and 2 or as seen from the groove 1 in FIG. 12. Thus, when the format of the present invention is applied to a land/groove recording format which is advantageous for a narrow track pitch, since the same address information of opposite polarity may be used in the adjacent land and groove of the side of the wobbled laser beam of the two laser beams. Therefore, the tracking may be made by a few address information without using different address informations on the adjacent land and groove.

As described above, according to this embodiment, since the adjacent land and groove may form a shared address by wobbling one laser beam of the two laser beams, it is possible to decrease a redundancy. Moreover, by wobbling one laser beam to be wobbled in the direction away from the other laser beam which is not wobbled, it is possible to decrease limits required when the groove width is controlled. At that time, since there is no risk that the wobbled laser beam will not protrude to the other laser beam, the address signal on the land side may become highly reliable. Furthermore, since the wobbled amount of the maximum beam size may be maintained, the amplitude of the push-pull signal required to effect the tracking for detecting the groove may be increased, thereby making it possible to reproduce a signal having a satisfactory S/N (signal-to-noise ratio).

According to the optical information recording apparatus of this embodiment, since the optical information recording apparatus for forming the groove whose one-side is modulated on the optical recording medium by turning on or off one laser beam of two laser beams in response to a modulation signal includes a device for wobbling the one laser beam controlled on or off so as not to affect the other laser beam, the light intensity of the one laser beam is not added to the light intensity of the other laser beam which is not wobbled by the wobbled amount, and the influence of the offset exerted on the other-side of groove that should not be modulated may be decreased. Also, since a shared address for the adjacent land and groove may be formed by wobbling one laser beam of two laser beams, it is possible to decrease a redundancy in information recording.

According to the optical information recording apparatus of this embodiment, since the one laser beam controlled on or off is wobbled in the direction away from the other laser beam, or the laser beam to be wobbled is wobbled in the direction away from the other laser beam which is not wobbled in the above apparatus, it is possible to decrease limits required when the groove is controlled. Also, at that time, since there is no risk that one wobbled laser beam will not protrude to the other laser beam, it is possible to make the address signal on the land side become highly reliable.

According to the optical information recording apparatus of this embodiment, when one laser beam is controlled to be turned on or off, since the light intensity of the one laser beams is increased or decreased stepwise in the above apparatus, it is possible to maintain the wobbled amount of the maximum beam size. Hence, the amplitude of the push-pull signal required to effect the tracking to detect the groove may be increased, thereby making it possible to reproduce a signal at a satisfactory S/N.

According to the optical information recording apparatus of this embodiment, since the above optical information recording apparatus includes the one-side wobbling address generating unit for generating the address on the optical recording medium for controlling the one laser beam, the one-side wobbling address generating unit generates the track address and the frame address relative to the signal from the signal source, thereby making it possible to record the track address and the frame address on the optical disc for controlling one laser beam of two laser beams which is used for wobbling.

According to the optical information recording apparatus of this embodiment, since the above optical information recording apparatus includes the formatter for formatting the modulation signal so as to generate the address on the optical recording medium for controlling the one laser beam, when the signal from the signal source is formatted to the modulation signal, the one-side wobbling address generating unit generates the track address and the frame address and the formatting is carried out by the same, thereby making it possible to record the track address and the frame address on the optical disc for controlling the one laser beam of two laser beams which is wobbled.

Further, according to the optical information recording method of this embodiment, in the optical information recording method in which the groove whose one-side is modulated only is sequentially formed on the optical recording medium by turning on or off one laser beam of two laser beams in response to the modulation signal and desired data is recorded by the groove, since the one laser beam controlled on or off is wobbled so as not to affect the other laser beam, in the disc cutting process, the light intensity of the one laser beam is not added to the light intensity of the other laser beam which is not wobbled by the wobbled amount, and the influence of the offset exerted on the other-side of groove that should not be modulated may be decreased. Also, since the shared address for the adjacent land and groove may be formed by wobbling one laser beam of two laser beams, the disc cutting may be executed while the redundancy in information recording may be decreased.

Furthermore, according to the optical information recording medium of this embodiment, in the optical information recording medium in which a groove whose one-side is modulated only is sequentially formed on the optical recording medium by turning on or off one laser beam of two laser beams in response to the modulation signal and desired data is recorded by the groove, since the groove is formed on the optical information recording medium by wobbling the one laser beam controlled on or off so as not to affect the other laser beam, when the optical disc is manufactured, the light intensity of the one laser beam is not added to the light intensity of the other laser beam which is not wobbled by the wobbled amount, and the influence of the offset exerted on the other-side of groove that should not be modulated may be decreased. Also, since the adjacent land and groove may form the shared address by wobbling one laser beam of two laser beams, it is possible to obtain the optical disc in which the redundancy in information recording may be decreased.

While the present invention has been described so far on the assumption that the mode called the ZCAV format in which the recording and reproducing clock is changed at every zone of the disc is employed, the present invention is no limited thereto, and may be similarly applied to a CAV (constant angular velocity) in which the rotational speed of the spindle motor is always constant or a ZCLV (zone constant linear velocity) in which a linear velocity becomes constant at every zone of the disc. At that time, while a plurality of one-side wobbling addresses are maintained at every radius area in which the recording and reproducing frequencies are different and these one-sided wobbling addresses are switched in accordance with a recording radius according to the ZCAV format, in the CAV format, the one-side wobbling address may be formed as a constant one-sided wobbling address or the one-side wobbling address may be switched in response to data.

According to an optical information recording apparatus of the present invention, an optical information recording apparatus for forming a groove whose one side is only wobbled or modulated on an optical recording medium by turning on or off one of two laser beams in accordance with a modulation signal includes a device for wobbling the one laser beam controlled on or off in such a manner that the one laser beam may not affect the other laser beam. Therefore, a light intensity of the one laser beam is not added to a light intensity of the other laser beam which is not wobbled, by a wobbled amount. Thus, the other-side of groove which should not be modulated may be protected from being affected by the offset. Also, one laser beam of two laser beams is wobbled, whereby adjacent land and groove may form a shared address. Thus, it is possible to lower a redundancy in information recording.

Further, in the above optical information recording apparatus of the present invention, since the one laser beam controlled on or off is wobbled in the side away from the other laser beam, or the laser beam to be wobbled is wobbled in the direction away from the other laser beam which is not wobbled, whereby limits imposed upon controlling the groove width may be reduced. At that time, since the wobbled laser beam does not protrude to the other laser beam, an address signal on the land side may be made highly reliable.

Further, in the above optical information recording apparatus of the present invention, when the one laser beam is controlled to be turned on or off, a light intensity of the above one the laser beam is stepwise increased or decreased so that a wobbled amount of a maximum beam size may be maintained. Therefore, an amplitude of a push-pull signal required in the tracking for detecting the groove may be increased, thereby making it possible to reproduce a signal with a satisfactory S/N.

Further, since the above optical information recording apparatus according to the present invention includes the one-side wobbling address generating unit for generating an address for controlling the one laser beam on the optical recording medium, the one-side wobbling address generating unit generates a track address and a frame address for a signal from a signal source, whereby the track address and the frame address for controlling the one beam of two laser beams which is wobbled may be recorded on the optical disc.

Further, since the above optical information recording apparatus of the present invention includes the formatter for formatting the modulation signal so as to generate an address for controlling the one laser beam on the optical recording medium, when a signal from a signal source is formatted into a modulation signal, the one-side wobbling address generating unit generates a track address and a frame address, whereby the track address and the frame address for controlling one laser beam of two laser beams which is wobbled may be recorded on the optical disc.

According to the optical information recording method of the present invention, in the optical information recording method in which a groove whose one side is wobbled is sequentially formed on an optical recording medium by turning on or off one laser beam of two laser beams in accordance with a modulation signal and desired data is recorded by the groove, the one laser beam controlled on or off is wobbled in such a manner that the one laser beam may not affect the other laser beam. Thus, in the disc cutting process, a light intensity of the one laser beam is not added to a light intensity of the other laser beam which is not wobbled, by a wobbled amount. Thus, the other-side of groove which should not be modulated may be protected from being affected by the offset. Also, one side of two laser beams is wobbled, whereby adjacent land and groove may form a shared address. Thus, a disc may be treated by the disc cutting process while a redundancy in information recording may be lowered.

According to the optical information recording medium of the present invention, in the optical information recording medium in which a groove whose one side is wobbled is sequentially formed on an optical recording medium by turning on or off one laser beam of two laser beams in accordance with a modulation signal and desired data is recorded by the groove, the groove is formed by wobbling the one laser beam controlled on or off in such a manner that the one laser beam may not affect the other laser beam. When an optical disc is manufactured, a light intensity of the one laser beam is not added to a light intensity of the other laser beam which is not wobbled, by a wobbled amount. Thus, the other-side of groove which should not be modulated may be protected from being affected by the offset. Also, one laser beam of two laser beams is wobbled, whereby adjacent land and groove may form a shared address. Thus, there may be provided the optical disc in which a redundancy in information recording may be lowered.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical information recording apparatus, comprising:
   at least one source of two laser beams for creating a groove in an optical recording medium;
   an optical system via which laser beams provided by the at least one laser beam source are directed onto the optical recording medium;
   a modulation signal source which provides a modulation signal; and
   means for wobbling one of said laser beams to create a groove with a wobbled side wall on said optical recording medium, said means turning said one laser beam on and off in accordance with the modulation signal, excluding a time assigned for writing a clock mark, to eliminate additive influence of one laser beam on said other laser beam due to superpositioning of the laser beams on one another, the other of said laser beams being left on when said one laser beam is turned off.

2. An optical information recording apparatus as claimed in claim 1, wherein said one laser beam controlled on or off is wobbled to the side away from the other laser beam.

3. An optical information recording apparatus according to claim 2, further comprising a formatter for formatting said modulation signal so as to generate an address for controlling said one laser beam on said optical recording medium.

4. An optical information recording apparatus as claimed in claim 1, wherein when said one laser beam is controlled on or off, a light intensity of said one laser beam is increased or decreased stepwise.

5. An optical information recording apparatus according to claim 1, further comprising a one-side wobbling address generating unit for generating an address for controlling said one laser beam on said optical recording medium.

6. In an optical information recording method in which a groove is formed in an optical recording medium, one side of which groove is wobbled, the improvement comprising the following steps:
   selectively generating two laser beams for creating a groove in the optical recording medium;

directing said laser beams via an optical system onto the optical recording medium to create the groove;

wobbling one of said laser beams to generate address information in a wobbled side of the groove modulating one of said laser beams on and off in accordance with a modulation signal in such a manner that the wobbled laser beam is turned on and off while said other laser beam is left on thereby to eliminate superpositioning influence of the other laser beam of the recording medium.

* * * * *